United States Patent
Nagar et al.

(10) Patent No.: US 11,315,068 B2
(45) Date of Patent: Apr. 26, 2022

(54) PRODUCT, SYSTEM, AND METHOD FOR DETERMINING SECONDARY LOCATIONS FOR FULFILLMENT OF ITEMS BY A FULFILLMENT SYSTEM

(71) Applicant: International Business Machines Corporation, Armonk, NY (US)

(72) Inventors: Raghuveer P. Nagar, Kota (IN); Satisha C. Honnavalli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 16/240,708

(22) Filed: Jan. 4, 2019

(65) Prior Publication Data
US 2020/0219055 A1    Jul. 9, 2020

(51) Int. Cl.
| | |
|---|---|
| G06Q 10/08 | (2012.01) |
| G06Q 30/02 | (2012.01) |
| G06F 40/295 | (2020.01) |

(52) U.S. Cl.
CPC ....... *G06Q 10/0835* (2013.01); *G06F 40/295* (2020.01); *G06Q 10/0833* (2013.01); *G06Q 30/0283* (2013.01)

(58) Field of Classification Search
CPC .................................................. G06F 40/295
(Continued)

(56) References Cited

U.S. PATENT DOCUMENTS

| | | | | |
|---|---|---|---|---|
| 7,962,422 B1 * | 6/2011 | Melechko | .......... | G06Q 10/0833 705/338 |
| 8,554,694 B1 * | 10/2013 | Ward | ................ | G06Q 30/0635 705/330 |

(Continued)

FOREIGN PATENT DOCUMENTS

WO    2014164831    10/2014

OTHER PUBLICATIONS

In5steps; "Change shipping address in Amazon order/change default"; Accessed as of Jul. 24, 2018; in5stepstutorials.com; pp. 1-2; http://in5stepstutorials.com/amazon/change-shipping-address-amazon-orders-change-default.php (Year: 2018).*

(Continued)

*Primary Examiner* — Allison G Wood
*Assistant Examiner* — Michael C Moroney
(74) *Attorney, Agent, or Firm* — Konrad Raynes Davda & Victor LLP; David W. Victor

(57) ABSTRACT

Provided are a computer program product, system, and method for determining secondary locations for fulfilment of items by a fulfilment system. A request is received for an item from a user. A primary location of the user is determined. User information in a data source is processed by a natural language processing module to determine whether the user has travel plans to a secondary location for a travel time period that includes an expected delivery date of the item to the secondary location. A determination is made of a secondary attribute of the item associated with the secondary location. A graphical user interface is generated with graphical elements visually representing a first attribute of the primary location, the determined secondary attribute, and computer commands to invoke a workflow to deliver the item to at least one of the primary location and the secondary location.

17 Claims, 9 Drawing Sheets

(58) Field of Classification Search
USPC .................................................. 705/335, 7.35
See application file for complete search history.

(56) References Cited

U.S. PATENT DOCUMENTS

| | | | |
|---|---|---|---|
| 9,009,093 B1 | 4/2015 | Omoigui | |
| 9,123,014 B1 | 9/2015 | Erdmann et al. | |
| 9,356,961 B1* | 5/2016 | Todd | H04L 63/1441 |
| 11,205,188 B1* | 12/2021 | Engle | G06Q 30/0631 |
| 2009/0125380 A1 | 5/2009 | Otto et al. | |
| 2013/0152139 A1* | 6/2013 | Davis | H04H 60/61 |
| | | | 725/61 |
| 2013/0297551 A1* | 11/2013 | Smith | G06N 5/02 |
| | | | 706/48 |
| 2014/0222711 A1* | 8/2014 | Tibbs | G06Q 10/0833 |
| | | | 705/337 |
| 2015/0046365 A1* | 2/2015 | Zamer | G06Q 10/0838 |
| | | | 705/341 |
| 2015/0193724 A1* | 7/2015 | Stevens | G06Q 10/083 |
| | | | 705/330 |
| 2016/0189097 A1 | 6/2016 | Padmaraagam et al. | |
| 2018/0365334 A1* | 12/2018 | Semlani | G06F 40/295 |
| 2019/0199761 A1* | 6/2019 | Felman | H04L 67/22 |

OTHER PUBLICATIONS

D. Inci, "Displaying Different Pricing Based on Location (States, Regions) on an eCommerce Site", dated Jan. 30, 2014, (online), retrieved from the Internet on Dec. 1, 2018 at URL>https://www.optimum7.com/blog/programming-2/location-based-pricing.html. Total 4 pages.

"Location Based Prices Displayed on Local Currency and Checked Out In Store Currency Converted at Shopify XE Rate" dated Jun. 2, 2017, (online), retrieved from the Internet on Dec. 1, 2018 at URL>https://ecommerce.shopify.com/c/shopify-apps/t/location-based-prices-displayed-in-local-currency-and-checked-out-in-store-currency-converted-at-shopify-xe-rate-441491. Total 5 pages.

* cited by examiner

PRODUCT, SYSTEM, AND METHOD FOR DETERMINING SECONDARY LOCATIONS FOR FULFILLMENT OF ITEMS BY A FULFILLMENT SYSTEM

BACKGROUND OF THE INVENTION

1. Field of the Invention

The present invention relates to a computer program product, system, and method for determining secondary locations for fulfilment of items by a fulfilment system.

2. Description of the Related Art

A fulfilment system presents a user options for delivery, usually to a primary location For instance, when the user selects an item for purchase through a Graphical User Interface (GUI), such as a web site, the fulfilment system will present shipping options though the GUI to the user home location, office location or other default locations the user previously specified.

There is a need in the art for improved techniques for providing locations to the user at which to fulfill delivery of a procured item.

SUMMARY

Provided are a computer program product, system, and method for determining secondary locations for fulfilment of items by a fulfilment system. A request is received for an item from a user. A primary location of the user is determined. User information in a data source is processed by a natural language processing module to determine whether the user has travel plans to a secondary location other than the primary location for a travel time period that includes an expected delivery date of the item to the secondary location. A determination is made of a secondary attribute of the item associated with the secondary location. A graphical user interface is generated with graphical elements visually representing a first attribute of the primary location, the determined secondary attribute, and computer commands to invoke a workflow to deliver the item to at least one of the primary location and the secondary location in response to determining that the expected delivery date falls within the travel time period at the secondary location.

DETAILED DESCRIPTION

Current fulfilment systems provide a delivery option based on a default user setting or a new user entered address. However, the user may be available at different secondary locations, such as during travels, to receive an item. Current fulfilment systems are not able to provide uses information on such additional delivery options.

Described embodiments provide improvements to computer technology for selecting fulfilment locations at which a requested item or product is to be delivered that uses natural language processing programs to process different user data sources to determine if the user will travel or be available at additional secondary locations for delivery of a rested item. Described embodiments use natural language processing to automatically scan user data sources, such as a calendar database, email or message database, and browser history to interpret this content to determine if the user will be travelling to any secondary locations. Described embodiments automatically determine whether the item may be fulfilled at the secondary locations and, if so, present the user the opportunity to select these secondary travel locations for delivery. This use of natural language processing provides the user with different delivery options and information on the secondary location delivery to increase the likelihood the user will accept or order the item given the additional delivery options.

Figure 1:
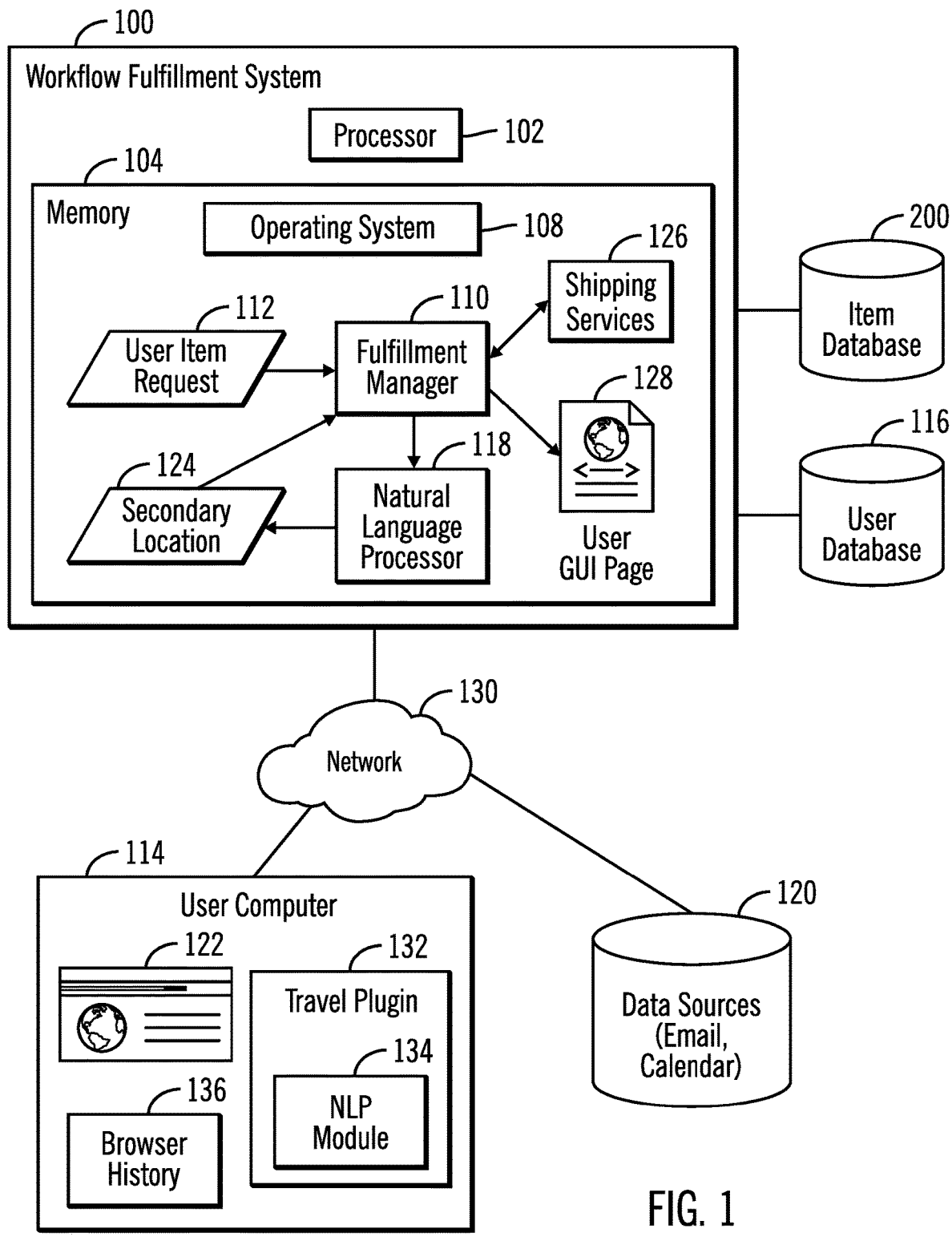
FIG. 1 illustrates an embodiment of a fulfilment computing environment.

FIG. 1 illustrates an embodiment of a workflow fulfillment system 100 in which embodiments are implemented. The workflow fulfillment system 100 includes a processor 102 and a main memory 104. The main memory 104 includes various program components including an operating system 108; fulfilment manager 110 to process a user item request 112 received from a user computer 114; an item database 200 having information on items the user may request; a user database 116 having information on users; a natural language processor (NLP) 118, such as by way of example, the Watson™ Natural Language Understanding program, that interprets user information from data sources 120, e.g., user email and calendar databases, and a user browser history 136 at a web browser 122 at the user computer 114, to determine whether the user will be at secondary travel locations 124 for travel time periods; shipping services 126 application program interfaces (APIs) the fulfillment manager 110 calls to obtain cost and shipment times to ship the items to different locations from a shipping service; and a user Graphical User Interface (GUI) page 128, such as a web browser page, the fulfillment manager 110 generates to provide the user receiving the GUI page 128 an option to select to ship the item to different locations, such as a primary default location or determined secondary locations 124 at which the user will be travelling.

The workflow fulfillment system 100 communicates with the user computer 114 and data sources 120 over a network 130, such as the Internet. The user computer 114 further includes a travel plugin 132, which may comprise a browser 122 plugin, supplied by the workflow fulfilment system 100 to the user computer 114. The travel plugin 132 includes a natural language processing (NLP) module 134 to process a browser history 136 to determine user travel plans to secondary locations. The browser history 136 may comprise web cookies, which are small files stored on the user computer 114 that hold data specific to the user browsing activity sent from a web site. For instance, travel websites may store web cookies having user searches for travelling to different secondary locations, travel itineraries, and/or information on tickets purchased to travel to a secondary location. The browser history 136 may further comprise cached web pages the user previously accessed with the browser 122.

The NLPs 118 and 134 may interpret the information processed, data sources 120 and browser history 136, to determine travel plans the user has expressed an intent to pursue and/or travel plans that have been finalized, such as booked travel arrangements, e.g., airplane, boat, etc., and accommodations.

The memory 104 may comprise suitable volatile or non-volatile memory devices.

Generally, program modules, such as the program components 108, 110, 118, 126, 122, 132, 134 may comprise routines, programs, objects, components, logic, data structures, and so on that perform particular tasks or implement particular abstract data types. The program components and hardware devices of the workflow fulfilment system 100 of FIG. 1 may be implemented in one or more computer systems, where if they are implemented in multiple computer systems, then the computer systems may communicate over a network.

The program components 108, 110, 118, 126, 122, 132, 134 may be accessed by the processor 102 from the memory 104 to execute. Alternatively, some or all of the program components 108, 110, 118, 126, 122, 132, 134 may be implemented in separate hardware devices, such as Application Specific Integrated Circuit (ASIC) hardware devices.

The functions described as performed by the programs 108, 110, 118, 126, 122, 132, 134 may be implemented as program code in fewer program modules than shown or implemented as program code throughout a greater number of program modules than shown.

The arrows shown in FIG. 1 between the components 110, 112, 124, 118, 126, 128 represent a data flow between the components.

The network 130 may comprise a Storage Area Network (SAN), Local Area Network (LAN), Intranet, the Internet, Wide Area Network (WAN), peer-to-peer network, wireless network, arbitrated loop network, etc.

The term "user" as used herein may refer to a person or computer process that consumes the information in the user GUI page 128 and generates the user item request 112 to initiate the fulfillment workflow.

Figure 2:
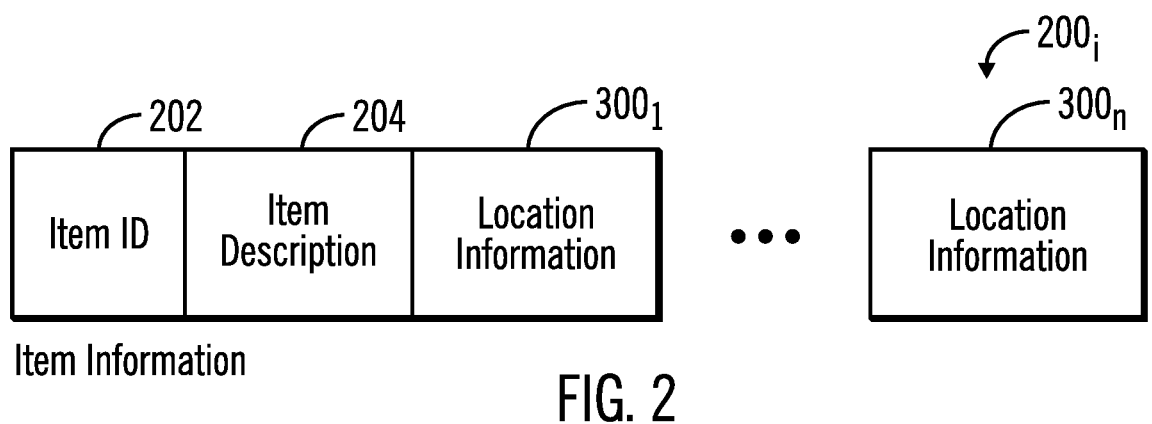
FIG. 2 illustrates an embodiment of item information in an item database.

FIG. 2 illustrates an embodiment of an instance of item information $200_i$ in the item database 200 having information on an item or product subject to a user item request 112, and including: an item identifier (ID) 202 identifying the item in the database 200; an item description 204 having information on the item 202, such as a description, reviews, warranty, etc.; and one or more instances of location information $300_1 \ldots 300_n$ for each location to which the item 202 may be shipped.

Figure 3:
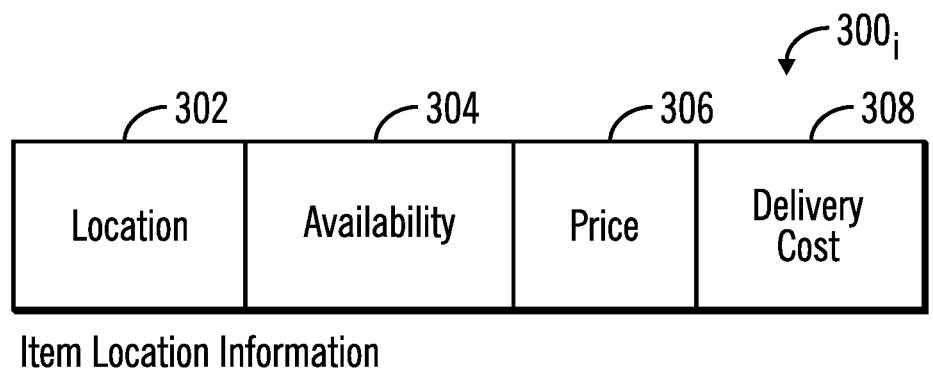
FIG. 3 illustrates an embodiment of item location information for items.

FIG. 3 illustrates an embodiment of location information $300_i$, such as location information $300_1 \ldots 300_n$ instances, and includes a location 302, such as a geographical location; availability 304 indicating whether the item is available to fulfill or ship to the location 302; a price 306; and a delivery cost 308.

Figure 4:
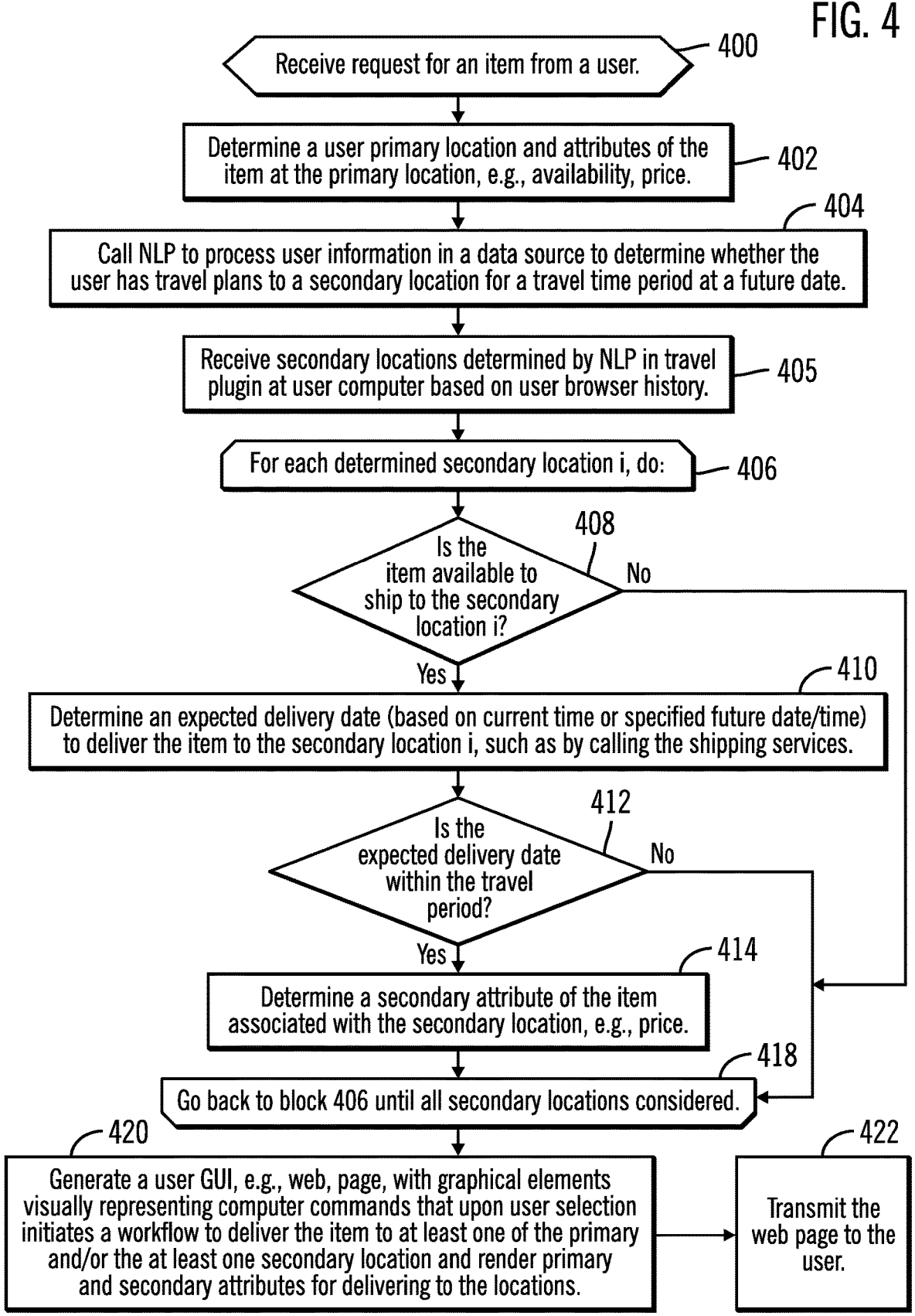
FIG. 4 illustrates an embodiment of operations to process a user request for an item to determine secondary locations in addition to a primary location for fulfilment of delivery of the item.

FIG. 4 illustrates an embodiment of operations performed by the fulfilment manager 110 and natural language processor (NLP) 118 to process a request for an item 112 from a user at the user computer 114 to determine whether there are alternative secondary locations 124 at which to fulfill the request. Upon receiving (at block 400) the request 112, the fulfilment manager 110 determines (at block 402) a user primary location, such as a default shipment location indicated in the user database 116, and attributes of the item at the primary location, such as price and shipment cost. The fulfilment manager 110 calls (at block 404) the NLP 118 to process user information in a data source 120 (such as described with respect to FIGS. 5 and 6) to determine whether the user has travel plans to a secondary location 124 for a travel time period at a future date. Additionally, the fulfilment manager 110 may receive (at block 405) secondary locations 124 from the travel plugin 132 at the user computer 114 (such as described with respect to FIG. 7). For each determined secondary location i where the user will be travelling, a loop of operations is performed from blocks 406 through 418 to process information on the secondary locations 124 to include in a user GUI page 128, e.g., web page, to use to select one of the primary or secondary locations at which to fulfil or ship the item.

In determining a secondary location, the NLP 118 may determine travel plans to a location without details on the location needed for fulfillment, such as an address, postal code, business name, etc., at a secondary location. In such case, the NLP 118 may supplement the secondary location information by performing an Internet search using the determined travel plans to locate further details on a secondary location, such as a specific address, suite number, postal code, etc. This supplemental information then may be part of the determined secondary location information that may be used to determine fulfillment options.

The determined secondary location may be in a different country or location from the primary location. Further, the determined secondary location may comprise a location the customer has not yet visited. In this way, the determined secondary locations provide fulfilment options different from one or more primary locations specified by the user in the user database 116.

At block 408, the fulfilment manager 110 determines whether the item is available to ship to the secondary location i being considered, which may be determined from the availability field 304 in the item information $200_i$ for the item in the database 200. If (at block 408) the item is available to ship to the secondary location i, then the fulfilment manager 110 determines (at bock 410) an expected delivery date (based on current time or specified future date/time) of the item to the secondary location i, such as by calling the shipping services 126. If (at block 412) the expected delivery date is within the determined travel time period during which the user is at the secondary location i, then the fulfilment manager 110 determines (at block 414) a secondary attribute associated with the secondary location i, such as a price 306 and delivery cost 308 at the location i. If (at block 408) the item is not available to ship to the secondary location i or if (at block 412) the expected delivery date is not within the travel time period, then control proceeds to block 418 to consider the next secondary location until all secondary locations 124 at which the user will be travelling determined from the data sources 120 or browser history 136 are processed.

After determining the information for all the secondary locations 124, the fulfilment manager 110 generates (at block 420) a user GUI (web) page 128, with graphical elements visually representing computer commands that upon user selection initiates a workflow to deliver the item to at least one of the primary and/or the at least one secondary location and render primary and secondary attributes for delivering to the locations. The user GUI page 128 is transmitted (at block 422) to the user computer 114 to render in the web browser 122 to allow the user to select a primary or secondary location at which to ship the item.

With the embodiment of operations of FIG. 4, the fulfilment manager 110 determines alternate locations at which the user may receive the requested item based on the user travel plans. This provides the user additional options to fulfill the delivery of the item. Further, by providing the user attributes on the item at the different secondary locations, such as the price, the user may appreciate the expanded purchasing options and experience increased satisfaction with the fulfillment services offered by the workflow fulfilment system 100. Yet further, by providing the user more options to select for delivery, there is a greater likelihood the user will complete the fulfilment, such as purchase the item, because one of the price and/or shipment options may incentivize them to complete the order for the item.

Figure 5:
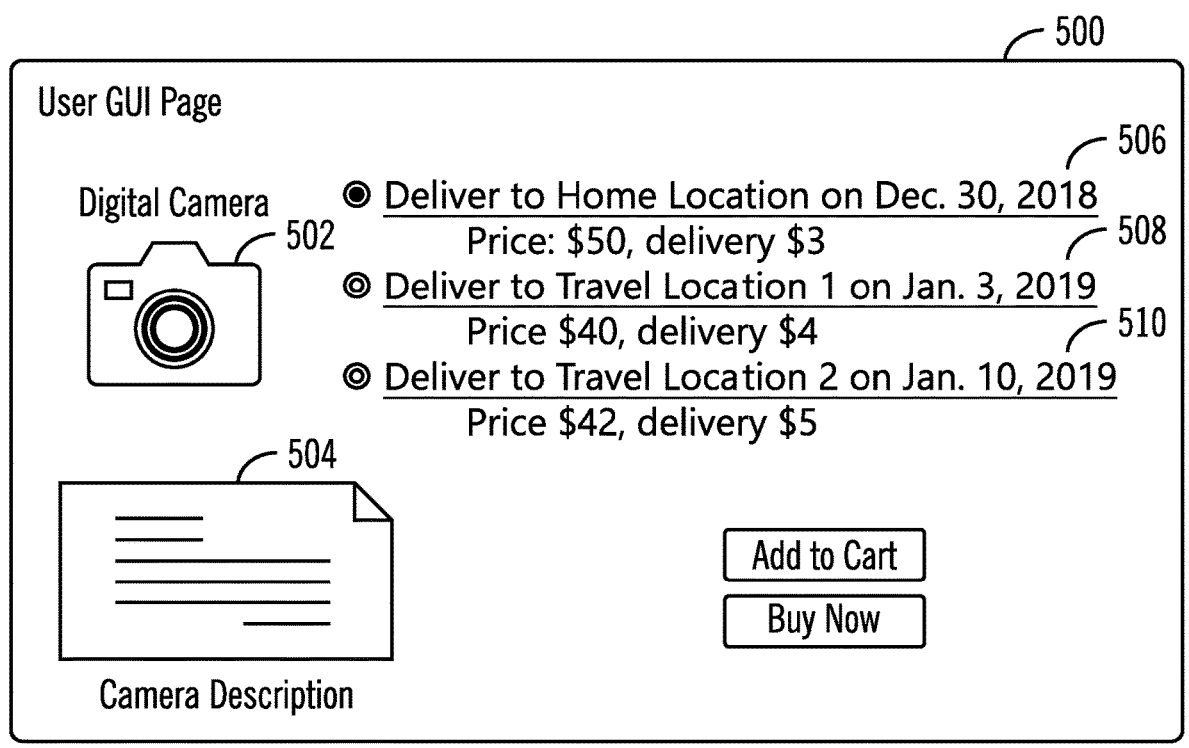
FIG. 5 illustrates an embodiment of a user graphical user interface (GUI) page providing secondary location fulfilment options.

FIG. 5 illustrates an example of the user GUI page 500, such as user GUI page 128. The GUI page 500 may display a picture or image 502 of the item, e.g., a digital camera in this example, but could be any item, and a description 504 of the item, which may be the description 204 from the item information 200ᵢ. The user GUI page 500 lists the shipment options for the primary location 506 and secondary locations 508, 510 at which the user will be travelling as determined by FIG. 4. The user may select one of the shipment options to have the item delivered to their primary location 506 or one of the secondary locations 508, 510.

Figure 6:
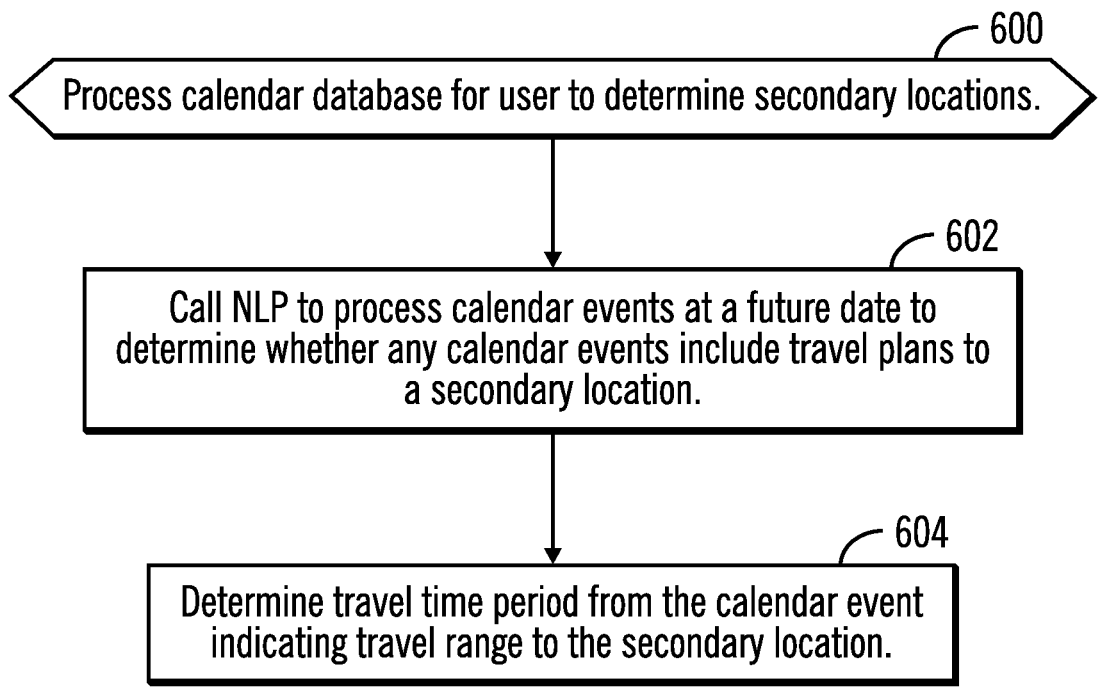
FIG. 6 illustrates an embodiment of operations to process a calendar database to determine secondary locations for fulfilment.

FIG. 6 illustrates an embodiment of operations performed by the fulfilment manager 110 to process a data source 120 comprising a calendar database having user calendar events to determine secondary locations, as performed at block 404 in FIG. 4. Upon processing (at block 600) the calendar database 120 to determine secondary locations, the fulfilment manager 110 calls (at block 602) the NLP 118 to process calendar events at a future date to determine whether any calendar events indicate travel plans to a secondary location 124. The fulfilment manager 110 determines (at block 604) a travel time period from the time range of the calendar event determined by the NLP 118 to indicate travel to a secondary location 124.

Figure 7:
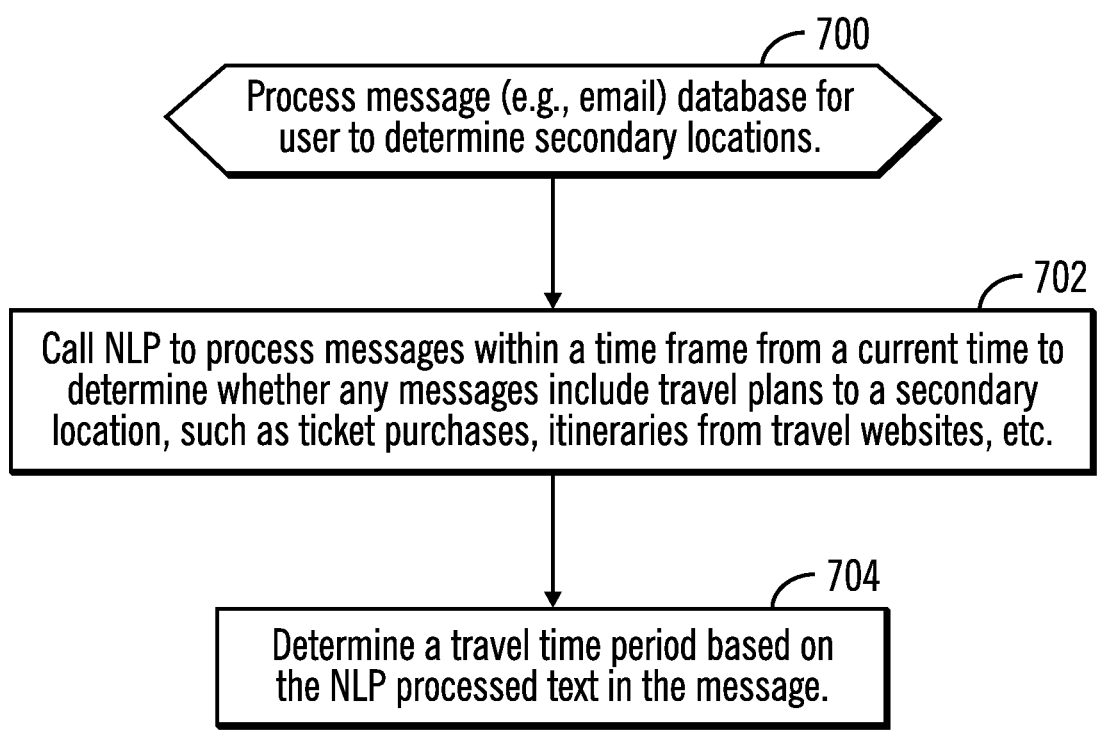
FIG. 7 illustrates an embodiment of operations to process a message database to determine secondary locations for fulfilment.

FIG. 7 illustrates an embodiment of operations performed by the fulfilment manager 110 to process a data source 120 comprising a message database having user messages, such as instant messages, emails, etc., to determine secondary locations 124, as performed at block 404 in FIG. 4. Upon processing (at block 700) the message database 120 to determine secondary locations 124, the fulfilment manager 110 calls (at block 702) the NLP 118 to process messages within a time frame from a current time to determine whether any messages include travel plans to a secondary location, such as ticket purchases, accommodation bookings, entertainment bookings, itineraries from travel websites, etc. The NLP 118 further processes (at block 704) the message having the travel plans to determine a travel time period for the travel plans from processing the message.

Figure 8:
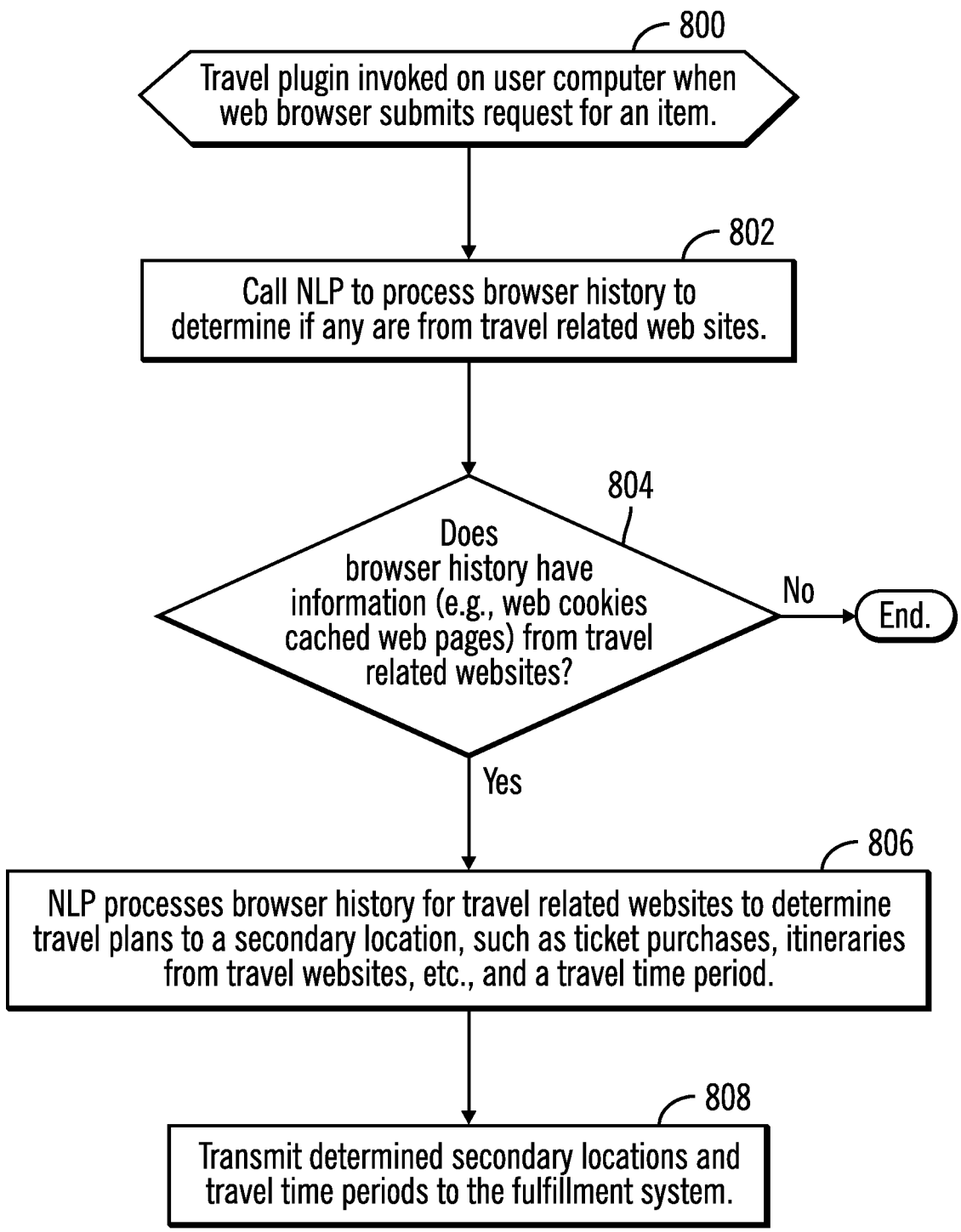
FIG. 8 illustrates an embodiment of operations to determine secondary locations from a user browser history.

FIG. 8 illustrates an embodiment of operations performed by the travel plugin 132, which may be invoked by the web browser 122 when the user submits a user item request 112 through the web browser 122, to determine secondary locations by processing the user's web history 136. Upon the web browser 122 invoking (at block 800) the travel plugin 132 when submitting a user item request 112, the travel plugin 132 calls (at block 802) the NLP 118 to process the browser history 136, such as website cookies or cached web pages, to determine if any are from travel related web sites. If (at block 804) there are browser history 136 items from travel related websites, then the NLP 118 processes (at block 806) the browser history 136 for travel related websites to determine travel plans to a secondary location, such as ticket purchases, itineraries from travel websites, etc., and a travel time period. The travel plugin 132 transmits (at block 808) the determined secondary locations and travel time periods to the workflow fulfilment system 100 to process to include in the secondary locations 124 to encode in the user GUI page 128, 500.

The embodiments of FIGS. 6, 7, and 8 use natural language processing technology to determine the secondary locations 124 from data sources 120 that would have information on user travel plans, such as calendar events in calendar databases, email or other messages, and web browser history. The fulfilment manager 110 may be provided password and access permission from the user to access data sources 120 having personal information, such as emails and messages.

Figure 9:
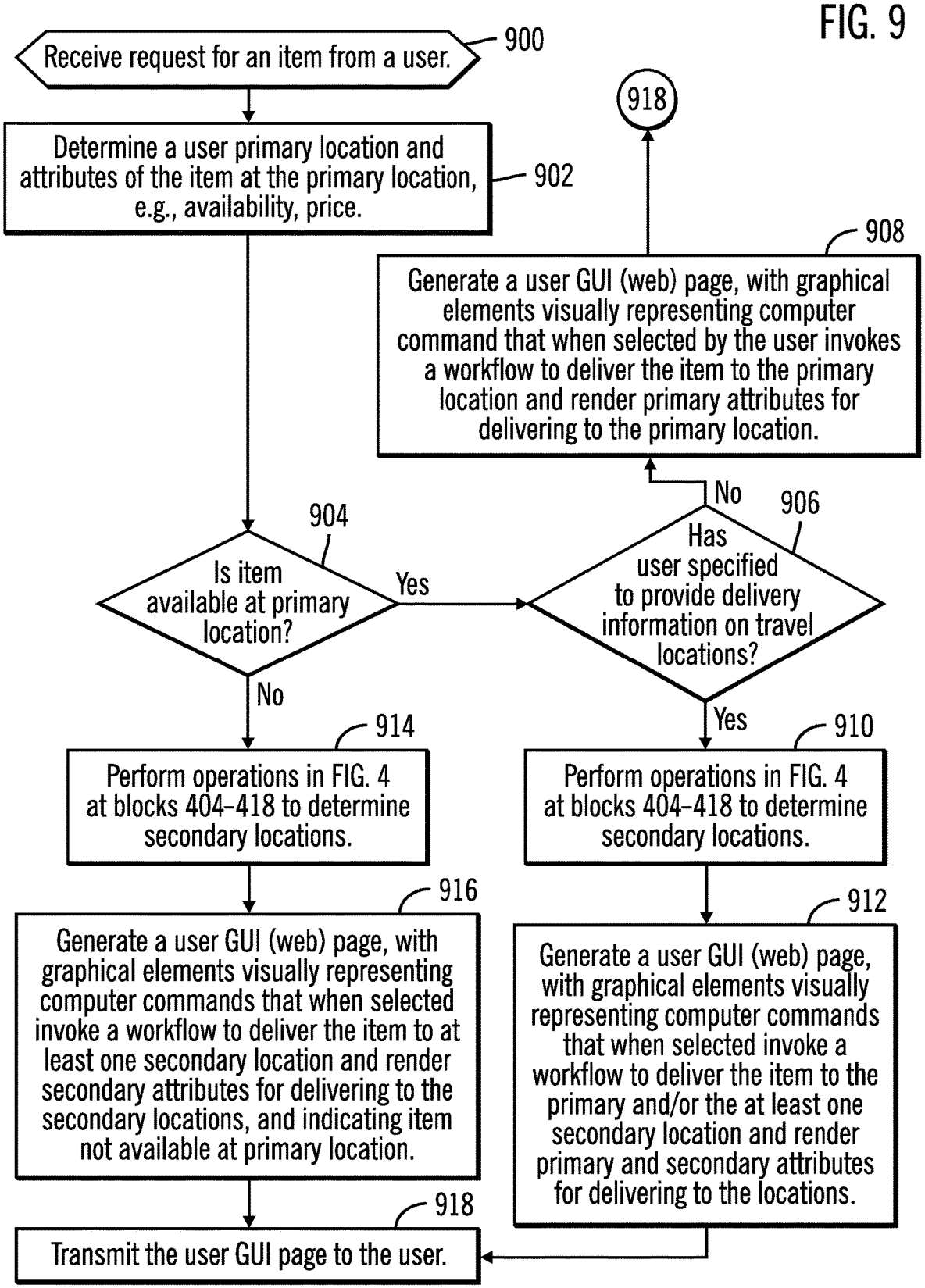
FIG. 9 illustrates an alternative embodiment of operations to process a user request for an item to determine secondary locations in addition to a primary location for fulfilment of delivery of the item.

FIG. 9 illustrates an embodiment of operations performed by the fulfilment manager 110 to process user settings, such as in the user database 116, to determine when to render information on secondary locations at which the user will travel. Upon receiving (at block 900) a request for an item from the user 112, the fulfilment manager 110 determines (at block 902) a user primary location and attributes of the item at the primary location, e.g., availability, price. If (at block 904) the item is available at the primary location, then the fulfilment manager 110 determines (at block 906) whether the user has specified in settings to provide delivery information on travel (secondary) locations. If (at block 906) the user has not specified to provide delivery information on travel locations when the primary location is available, then the fulfilment manager 110 generates (at block 908) a user GUI page 128, 500, with graphical elements visually representing computer commands that when selected by the user invokes a workflow to deliver the item to the one or more primary locations and render primary attributes for delivering to the primary locations. If (at block 906) the user has specified to provide delivery options for secondary (travel) locations 124, then the fulfilment manager 110 performs (at block 910) the operations in FIG. 4 at blocks 414 to 418 to determine the secondary locations 124. A user GUI page 128, 500 is generated (at block 912), with graphical elements visually representing computer commands that when selected invoke a workflow to deliver the item to the primary and/or one secondary location and render primary and secondary attributes for delivering to the locations.

If (at block 904) the item is not available at the primary location, then the fulfilment manager 110 automatically performs (at block 914) the operations in FIG. 4 at blocks 404 to 418 to determine the secondary locations. A user GUI page 128, 500 is generated (at block 916), with graphical elements visually representing computer commands that when selected invoke a workflow to deliver the item to the at least one secondary location and render secondary attributes for delivering to the secondary locations. The GUI page 128, 500 further indicates that the item is not available at the primary location. After generating the user GUI page 128, 500 at block 908, 912 or 916, the fulfilment manager 110 transmits (at block 918) the user GUI page 128, 500 to the user computer 114 to allow the user to select the shipment location from the provided primary and/or secondary locations 124.

With the embodiment of FIG. 9, if the object is not available at the primary location, then the fulfilment manager 110 automatically uses natural language processing to determine whether the item may be fulfilled at future travel locations to provide purchase opportunities for the user to increase the likelihood of a purchase. Further, if the user selects to also be provided provide secondary travel locations for shipment even when the primary location is available, then the secondary locations 124 may also be provided when fulfilment at the primary location is available to provide additional opportunities to the user to increase customer satisfaction and purchase possibilities.

Figure 10:
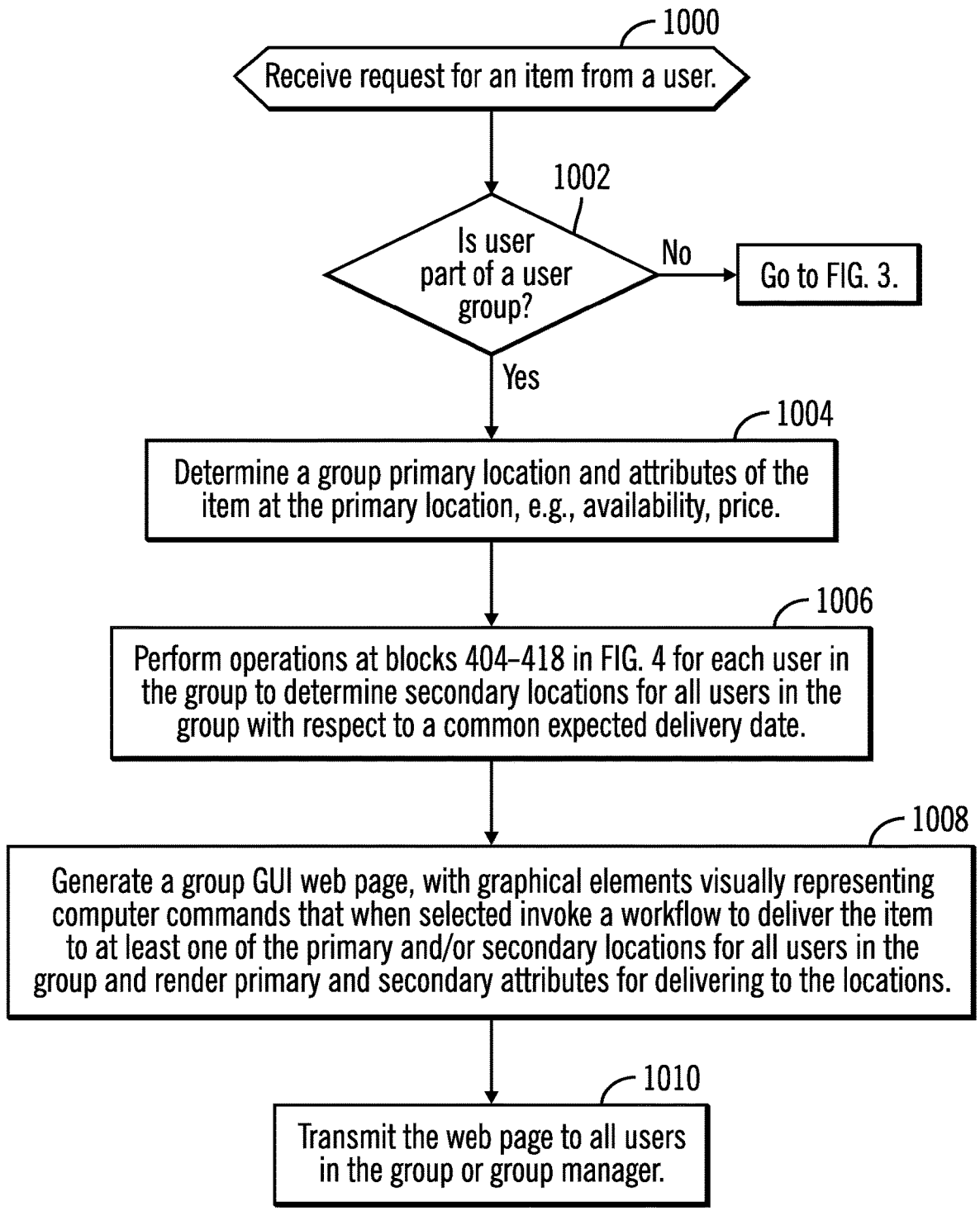
FIG. 10 illustrates an alternative embodiment of operations to process a user request for an item for a user in a group of users to determine secondary locations in addition to a primary location for fulfilment of delivery of the item.

FIG. 10 illustrates an embodiment of operations performed by the fulfilment manager 110 when the item request 112 is from a user in a group of users, so the procurement of the item is for the group. Upon receiving (at block 1000) a user item request 112, if (at block 1002) the user is part of a group of users, which may be indicated in the user database 116, then a group primary location is determined (at block 1004), such as from the user database 116, and attributes of the item at the primary location, such as availability and price, are determined. The operations at blocks 404-418 in FIG. 4 are performed (at block 1006) for each user in the group to determine secondary locations for all users in the group with respect to a common expected delivery date. A group GUI web page is generated (at block 1008), with graphical elements visually representing computer commands that when selected invoke a workflow to deliver the item to at least one of the primary and/or secondary locations for all users in the group and render primary and secondary attributes for delivering to the locations. The generated GUI page may be transmitted (at block 1010) to all users in the group, as determined from the user database 116, or a group manager indicated in the user database 116 for the group. If (at block 1002) the user is not part of a group, then control proceeds to FIG. 3 to determine secondary fulfilment locations for the user.

The embodiment of operations of FIG. 10 allows for determining secondary locations to deliver an item based on the travel plans for multiple users in a group to allow delivery to a selected secondary (travel) location at which the users of the group are present.

The described workflow fulfilment system 100 may be deployed in an ecommerce implementation for a retailer to use to allow consumers to select the different delivery locations at which to deliver a product. In alternative implementations, the workflow fulfilment system 100 may be used for procurement of items in other settings, such as government procurement and procurement within an organization.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
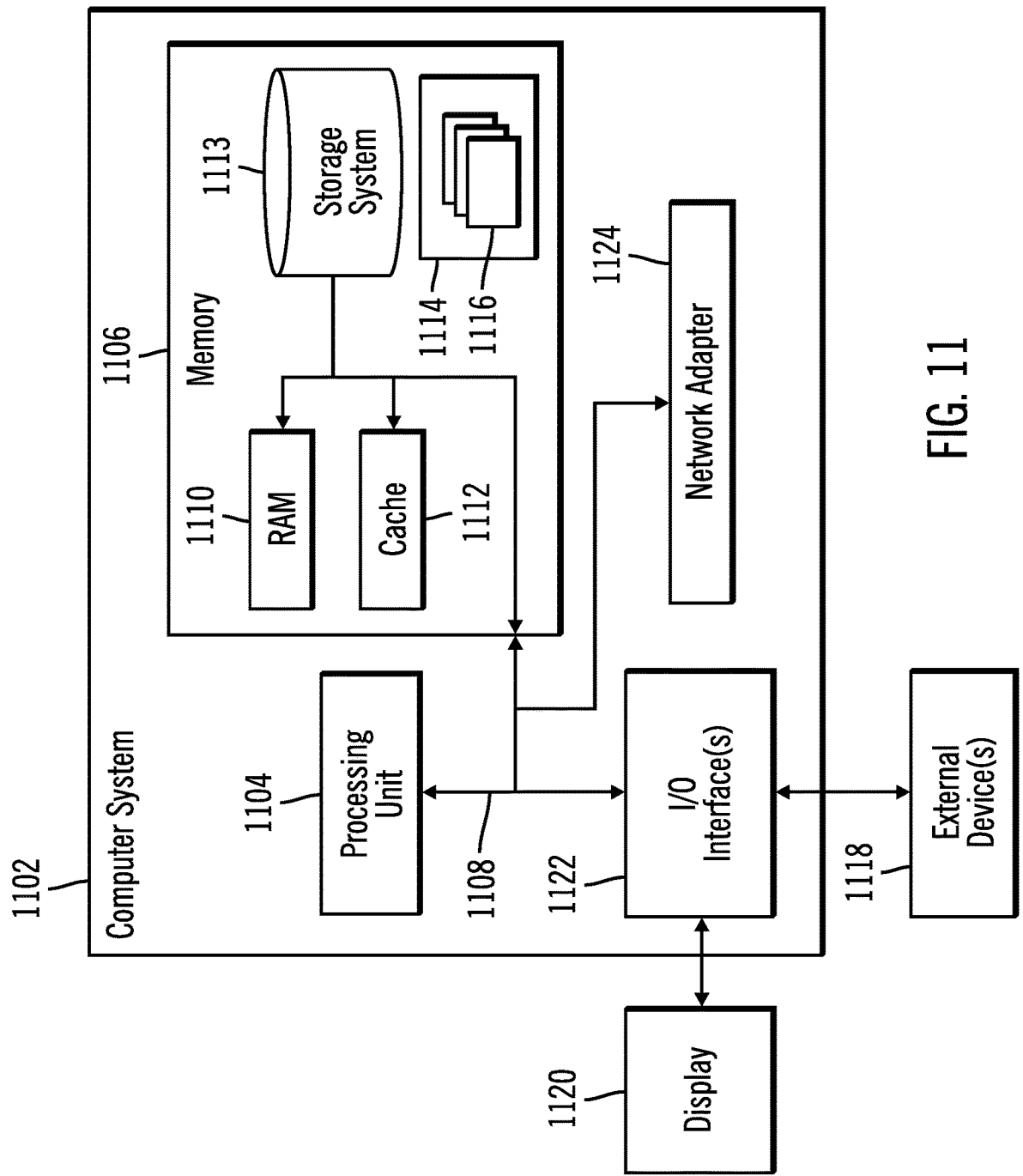
FIG. 11 illustrates a computing environment in which the components of FIG. 1 may be implemented.

The computational components of FIG. 1, including the workflow fulfilment system 100, the user computer 114, and data sources 120 may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing location information for item delivery at a fulfilment system in communication with a user computer over a network, wherein the computer program product comprises a computer readable storage medium at the fulfilment system having program instructions embodied therewith that when executed cause operations, the operations comprising:
   transmitting a browser plugin to the user computer to execute on the user computer, wherein the browser plugin includes a natural language processor (NLP), wherein the browser plugin is invoked by a web browser, in response to a request for an item through the web browser from the user computer, to process, with the NLP, a browser history at the user computer comprising at least one of web cookies and cached web pages from travel related web sites accessible through the user computer, to determine user travel plans to a secondary location to which a user will travel, geographically separate from a primary location of the user, and a travel time period the user will be at the secondary location;
   receiving from the browser plugin at the user computer the secondary location and the travel time period;
   determining whether an expected delivery date of the item to the secondary location is within the travel time period;
   in response to determining that the expected delivery date of the item is within the travel time period performing:
      determining a secondary attribute of the item associated with the secondary location;
      generating, in a graphical user interface, graphical elements visually representing a first attribute of the primary location, the determined secondary attribute, and computer commands to invoke a workflow to deliver the item to at least one of the primary location and the secondary location in response to determining that the expected delivery date falls within the travel time period at the secondary location; and
      transmitting the graphical user interface to the user computer over the network to enable the user to select to deliver the item to one of the primary location and the secondary location represented in the graphical user interface.

2. The computer program product of claim 1, wherein the expected delivery date comprises one of:
   the expected delivery date based on the user selecting to ship the item to the secondary location at a current time; and
   the expected delivery date based on the user selecting to ship the item to the secondary location at a future date and time.

3. The computer program product of claim 1, wherein the browser plugin further performs:
   processing calendar events in a calendar database to determine whether a calendar event at a future date indicates user travel plans to a secondary location; and
   determining the travel time period from a time range of the calendar event indicating the user travel plans to the secondary location in response to determining the calendar event indicating the user will be travelling to the secondary location.

4. The computer program product of claim 1, wherein the browser plugin further performs:
   processing messages in a message store to determine whether a message indicates travel plans to a secondary location for a travel time period.

5. The computer program product of claim 1, wherein the using the NLP determining travel plans comprises at least one of the NLP determining that the user intends to travel to a secondary location and that the user has made purchases for travel to the secondary location.

6. The computer program product of claim 1, wherein the operations further comprise:
   determining whether the item is unavailable to ship to the primary location; and
   determining whether the item is available to ship to the secondary location in response to determining that the item is unavailable to ship to the primary location, wherein the determining the secondary attribute and the generating the graphical user interface are performed in response to determining that the item is unavailable to ship to the primary location and available to ship to the secondary location.

7. The computer program product of claim 1, wherein a primary attribute indicates a primary price of the item at the primary location and the secondary attribute indicates a secondary price of the item at the secondary location.

8. The computer program product of claim 1, wherein the processing the browser history and the determining the secondary attribute are performed to determine all secondary locations other than the primary location for travel time periods that include an expected delivery date to the secondary location, wherein the generating the graphical elements further generates graphical elements representing computer commands to invoke workflows to deliver the item to the secondary locations.

9. The computer program product of claim 1, wherein the request for the item is from a group of users, and wherein the processing the browser history is performed for all users in the group to determine any of the users having travel plans to secondary locations other than the primary location for a travel time period that includes an expected delivery date to the secondary location, wherein the generated graphical elements further visually represent commands to invoke a workflow to deliver the item to the secondary locations for all the users in the group.

10. A system for providing location information for item delivery in communication with a user computer over a network, comprising:
   a processor; and
   a computer readable storage medium having program instructions that when executed by the processor cause operations, the operations comprising:
      transmitting a browser plugin to the user computer to execute on the user computer, wherein the browser plugin includes a natural language processor (NLP), wherein the browser plugin is invoked by a web browser in response to the user submitting a request for an item through the web browser from the user computer, to process, with the NLP, a browser history at the user computer comprising at least one of web cookies and cached web pages from travel related web sites accessible through the user computer, to determine user travel plans to a secondary location to which a user will travel, geographically separate from a primary location of the user, and a travel time period the user will be at the secondary location;
      receiving from the browser plugin at the user computer the secondary location and the travel time period;
      determining whether an expected delivery date of the item to the secondary location is within the travel time period;
      in response to determining that the expected delivery date of the item is within the travel time period performing:
         determining a secondary attribute of the item associated with the secondary location;
         generating, in a graphical user interface, graphical elements visually representing a first attribute of the primary location, the determined secondary attribute, and computer commands to invoke a workflow to deliver the item to at least one of the primary location and the secondary location in response to determining that the expected delivery date falls within the travel time period at the secondary location; and
         transmitting the graphical user interface to the user computer over the network to enable the user to select to deliver the item to one of the primary location and the secondary location represented in the graphical user interface.

11. The system of claim 10, wherein the browser plugin further performs:
   processing calendar events in a calendar database to determine whether a calendar event at a future date indicates user travel plans to a secondary location; and
   determining the travel time period from a time range of the calendar event indicating the user travel plans to the secondary location in response to determining the calendar event indicating the user will be travelling to the secondary location.

12. The system of claim 10, wherein the operations further comprise:
   determining whether the item is unavailable to ship to the primary location; and
   determining whether the item is available to ship to the secondary location in response to determining that the item is unavailable to ship to the primary location, wherein the determining the secondary attribute and the generating the graphical user interface are performed in response to determining that the item is unavailable to ship to the primary location and available to ship to the secondary location.

13. The system of claim 10, wherein the processing the browser history and the determining the secondary attribute are performed to determine all secondary locations other than the primary location for travel time periods that include an expected delivery date to the secondary location, wherein the generating the graphical elements further generates graphical elements representing computer commands to invoke workflows to deliver the item to the secondary locations.

14. A method implemented in a workflow fulfilment system for providing location information for item delivery in communication with a user computer over a network, comprising:
   transmitting a browser plugin to the user computer to execute on the user computer, wherein the browser plugin includes a natural language processor (NLP), wherein the browser plugin is invoked by a web browser, in response to the user submitting a request for an item through the web browser from the user computer, to process, with the NLP, a browser history at the user computer comprising at least one of web cookies and cached web pages from travel related web sites accessible through the user computer, to determine user travel plans to a secondary location to which a user will travel, geographically separate from a primary location of the user, and a travel time period the user will be at the secondary location;

receiving from the browser plugin at the user computer the secondary location and the travel time period;

determining whether an expected delivery date of the item to the secondary location is within the travel time period;

in response to determining that the expected delivery date of the item is within the travel time period performing:

determining a secondary attribute of the item associated with the secondary location;

generating, in a graphical user interface, graphical elements visually representing a first attribute of the primary location, the determined secondary attribute, and computer commands to invoke a workflow to deliver the item to at least one of the primary location and the secondary location in response to determining that the expected delivery date falls within the travel time period at the secondary location; and transmitting the graphical user interface to the user computer over the network to enable the user to select to deliver the item to one of the primary location and the secondary location represented in the graphical user interface.

15. The method of claim 14, wherein the browser plugin further performs: processing calendar events in a calendar database to determine whether a calendar event at a future date indicates user travel plans to a secondary location; and determining the travel time period from a time range of the calendar event indicating the user travel plans to the secondary location in response to determining the calendar event indicating the user will be travelling to the secondary location.

16. The method of claim 14, further comprising:

determining whether the item is unavailable to ship to the primary location; and determining whether the item is available to ship to the secondary location in response to determining that the item is unavailable to ship to the primary location, wherein the determining the secondary attribute and the generating the graphical user interface are performed in response to determining that the item is unavailable to ship to the primary location and available to ship to the secondary location.

17. The method of claim 14, wherein the processing the browser history and the determining the secondary attribute are performed to determine all secondary locations other than the primary location for travel time periods that include an expected delivery date to the secondary location, wherein the generating the graphical elements further generates graphical elements representing computer commands to invoke workflows to deliver the item to the secondary locations.

* * * * *